Oct. 13, 1959 L. A. MEACHAM 2,908,762

PARTY LINE IDENTIFICATION SYSTEM

Filed Sept. 27, 1957 4 Sheets-Sheet 1

INVENTOR
L. A. MEACHAM
BY Donald M Duft
ATTORNEY

INVENTOR
L. A. MEACHAM
BY Donald M Duft
ATTORNEY

Oct. 13, 1959 L. A. MEACHAM 2,908,762

PARTY LINE IDENTIFICATION SYSTEM

Filed Sept. 27, 1957 4 Sheets-Sheet 3

INVENTOR
L. A. MEACHAM
BY Donald M. Duft
ATTORNEY

Oct. 13, 1959 L. A. MEACHAM 2,908,762

PARTY LINE IDENTIFICATION SYSTEM

Filed Sept. 27, 1957 4 Sheets-Sheet 4

INVENTOR
L. A. MEACHAM
BY Donald M Duft
ATTORNEY.

United States Patent Office 2,908,762

Patented Oct. 13, 1959

2,908,762

PARTY LINE IDENTIFICATION SYSTEM

Larned A. Meacham, New Providence, N.J., assignor to Bell Telephone Laboratories, Incorporated, New York, N.Y., a corporation of New York Application September 27, 1957, Serial No. 686,610

20 Claims. (Cl. 179—17)

This invention relates in general to identification circuits and more particularly, to multiparty identification circuits which manifest the identity of the calling subscriber on a multiparty line.

Early in the development of the telephony art it became generally recognized that private line service was not economically feasible in every instance and that certain subscribers, such as those in sparsely populated areas of the country and those having a relatively low calling rate, could be served more economically by party lines. However, the introduction of party line service presented a concomitant problem, i.e., a simple method of identifying the calling subscriber on such lines. It is well known that the first method used to identify party line subscribers was for the central office operator to ask the calling subscriber his number and then to operate a register or perform some other manual act to insure that the proper party was charged for the call. It was soon recognized that this method of party identification was not ideal and left much to be desired.

Since these early times, the problem has attracted the attention of many inventors, as can be observed by a perusal of that portion of the telephony art pertaining to this subject-matter. Included in this art are a vast number of patents disclosing many different circuits for identifying calling party line subscribers. This developmental effort has, to date, produced commercially suitable circuits for automatically identifying subscribers on two-party lines. However, this effort has not yet produced a commercially acceptable identification circuit for party lines having three or more subscribers, as may be observed from the fact that even at the present stage of the telephony art, a majority of telephone companies are still searching for an economical and accurate means for performing this function.

The development of customer dialed toll switching systems, wherein a subscriber in one section of the country can dial a subscriber in another section of the country without the necessity of an intervening operator, intensifies the need for a suitable circuit which will identify the calling subscriber on lines serving three or more parties. Until such a circuit is found, subscribers served by lines of this type cannot be integrated on a fully automatic basis into the present day nationwide dialing system. At the present time, when a subscriber served by one of these lines dials a subscriber in another part of the country, the call is momentarily interrupted by an intercept operator who orally ascertains the identity of the calling subscriber and keys this information into the switching system. It is, therefore, quite apparent that the development of a suitable identification circuit for party line subscribers represents one of the more urgent problems in the present day telephony art.

Accordingly, the object of this invention is to facilitate the identification of calling subscribers on lines serving two or more subscribers.

A further object of the invention is to facilitate the identification of calling parties on multiparty lines by means which requires a minimum of additional equipment at the subscriber stations.

It is a further object of the invention to provide an improved station set having mutually compatible circuits for performing the functions of selective ringing and party identification.

It is a still further object of the invention to provide an improved station set for performing the functions of selective ringing and party identification by means of voice frequency signals.

The present invention is particularly adapted for use with telephone lines having transistorized subsets which utilize horn-type ringers instead of the conventional bell and clapper ringers. When these subsets are used, the central office applies a distinctive audio frequency ringing signal to the line upon the reception of a call for a subscriber thereon. The ringing signal is transmitted over the line to the called subscriber's subset where it is amplified by the transistor amplifier therein and applied to a small electroacoustical horn which emits a distinctive audible tone to notify the subscriber of the call. If there is only one subscriber on the line, the exact ringing frequency applied thereto is not critical, the only requirement being that it lies within the range of response of the horn ringer in that subset. On the other hand, if there are a plurality of subscribers on the line, the transistor ringer amplifier in each subset is tuned and made responsive to a frequency different from that for the other subsets on the same line. Therefore, when the central office receives a call for a subscriber on such a party line, it is necessary that the frequency of the applied ringing signal be equal to the frequency to which the ringer amplifier in the called subset is tuned.

Transistorized horn-type ringers working in accordance with these principles are disclosed in the following copending applications:

| Inventor | Serial No. | Filing Date |
|---|---|---|
| J. R. Power | 574,718 | Mar. 29, 1956. |
| L. A. Meacham | 469,802 | Nov. 18, 1954, Now Allowed. |
| L. A. Meacham—F. West | 469,633 | Nov. 18, 1954, Now Allowed. |
| L. A. Meacham | 574,714 | Mar. 29, 1956, Now Allowed. |
| L. A. Meacham | 574,715 | Mar. 29, 1956, Now Allowed. |

The present invention utilizes the feature whereby the transistorized ringer amplifier in each subset on a party line is responsive to a unique frequency. Normally, the output of the ringer amplifier in each subset is permanently connected to the horn ringer. In the present invention, the output of the ringer amplifier is fed through a pair of switchhook contacts to the horn ringer when the subset is in an on-hook condition and is fed back to the amplifier input when the subset is in an off-hook condition. The connecting of the output of the amplifier back to its input upon the initiation of a call from the subset, plus certain other connections which are completed at that time, causes the amplifier to oscillate for a fraction of a second and produce an audio frequency equal to that to which the amplifier is normally responsive during the on-hook condition of its subset. The output signal of the oscillator is applied to the line and transmitted thereover to the central office which ascertains the identity of the calling subset from the frequency of the applied signal.

Two alternative embodiments for performing calling party identification in this manner are shown herein. In the first, the operation of the switchhook contacts upon the initiation of a call feeds the ringer amplifier's output back to its input and closes a further circuit which, together with the feedback circuit, shock excites the amplifier into oscillation to produce an audio signal of a unique and distinctive frequency in the manner just described. This signal is applied to the line for transmission to the central office where frequency selective filters and detectors manifest which subscriber on the line is calling.

In the second embodiment, the ringer amplifier does not burst into oscillation the instant the switchhook contacts close to feed the output of the amplifier back to its input. In this circuit, the central office recognizes the request for service by one of the parties on the line and, in response thereto, causes a series of triggering pulses, each of a different frequency, to be applied to the line. The ringer amplifier in the calling subset remains in a quiescent condition until a trigger pulse of the frequency to which it is responsive is applied to the line, whereupon it is excited into oscillation to generate an audio signal of a distinctive frequency which is applied to the line and transmitted to the central office. Frequency responsive equipment in the central office ascertains the identity of the calling subscriber in the same manner as described in connection with the first alternative embodiment.

A feature of the invention relates to a ringer amplifier circuit which oscillates for a limited period of time upon the initiation of a call and impresses on the line a signal whose frequency identifies the calling station.

A further feature of the invention relates to a circuit which utilizes a frequency selective subset ringer amplifier as an oscillator upon the initiation of a call from the subset to transmit a signal of a distinctive frequency to the central office for party identification purposes.

A further feature of the invention relates to a frequency selective ringer amplifier circuit which oscillates upon the initiation of a call and impresses on the line a station identification signal whose frequency is the same as that to which the ringer amplifier is responsive during ringing intervals.

A further feature of the invention relates to a ringer amplifier circuit together with switchhook contacts which, upon the initiation of a call, close and complete a feedback path to cause the ringer amplifier to oscillate and impress upon the line a station identification signal whose frequency is the same as that to which the ringer amplifier is normally responsive during ringing intervals.

A further feature of the invention relates to a ringer amplifier circuit together with switchhook contacts which, upon the initiation of a call, close and complete a feedback path for said amplifier plus a shock excitation path for said amplifier whereby it oscillates and impresses upon the line a signal whose frequency is the same as that to which the amplifier is normally responsive during ringing intervals.

A further feature of the invention relates to a ringer amplifier which, in response to the initiation of a call and in response to a trigger pulse from the central office, impresses upon the line a station identification signal of limited duration whose frequency is the same as that to which the amplifier is normally responsive during the ringing intervals.

A further feature of the invention relates to a ringer amplifier which, upon the closure of a feedback path therefor and upon the reception of a trigger pulse from the central office, oscillates and applies to the line a station identification signal which is the same as that to which the amplifier is normally responsive during ringing intervals.

A further feature of the invention relates to the use of a ringer amplifier, biased for class C operation in a subset, which subset, upon the initiation of a call therefrom, closes a positive feedback path for said amplifier, which remains in a quiescent condition and does not oscillate until either a shock excitation pulse or a trigger pulse is received.

A further feature of the invention relates to the use of a normally charged condenser as a power supply means for a ringer amplifier in a subset, which subset, upon the initiation of a call therefrom, closes a positive feedback path through its switchhook contacts whereby its ringer amplifier oscillates for a short period of time, as determined by the capacity of said condenser, and impresses on the line a signal whose frequency is the same as that to which the amplifier is responsive during ringing intervals.

Further objects and features will become apparent upon consideration of the following description taken in conjunction with the drawings wherein:

Figs. 1 and 2 together illustrate one exemplary embodiment of the invention;

Fig. 3 indicates how Figs. 1 and 2 should be arranged with respect to each other;

Figures 1, 3:
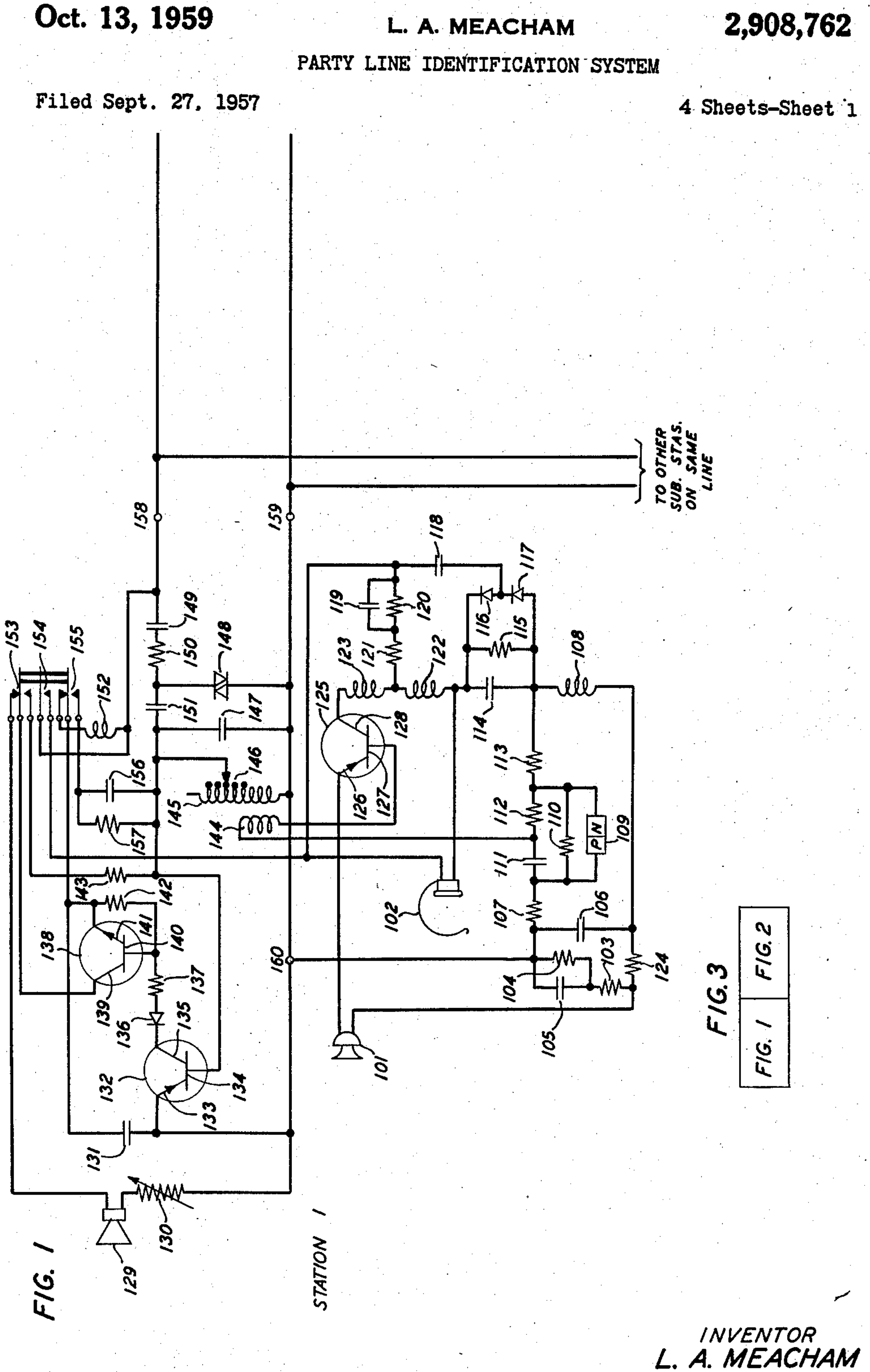
Figure 2:
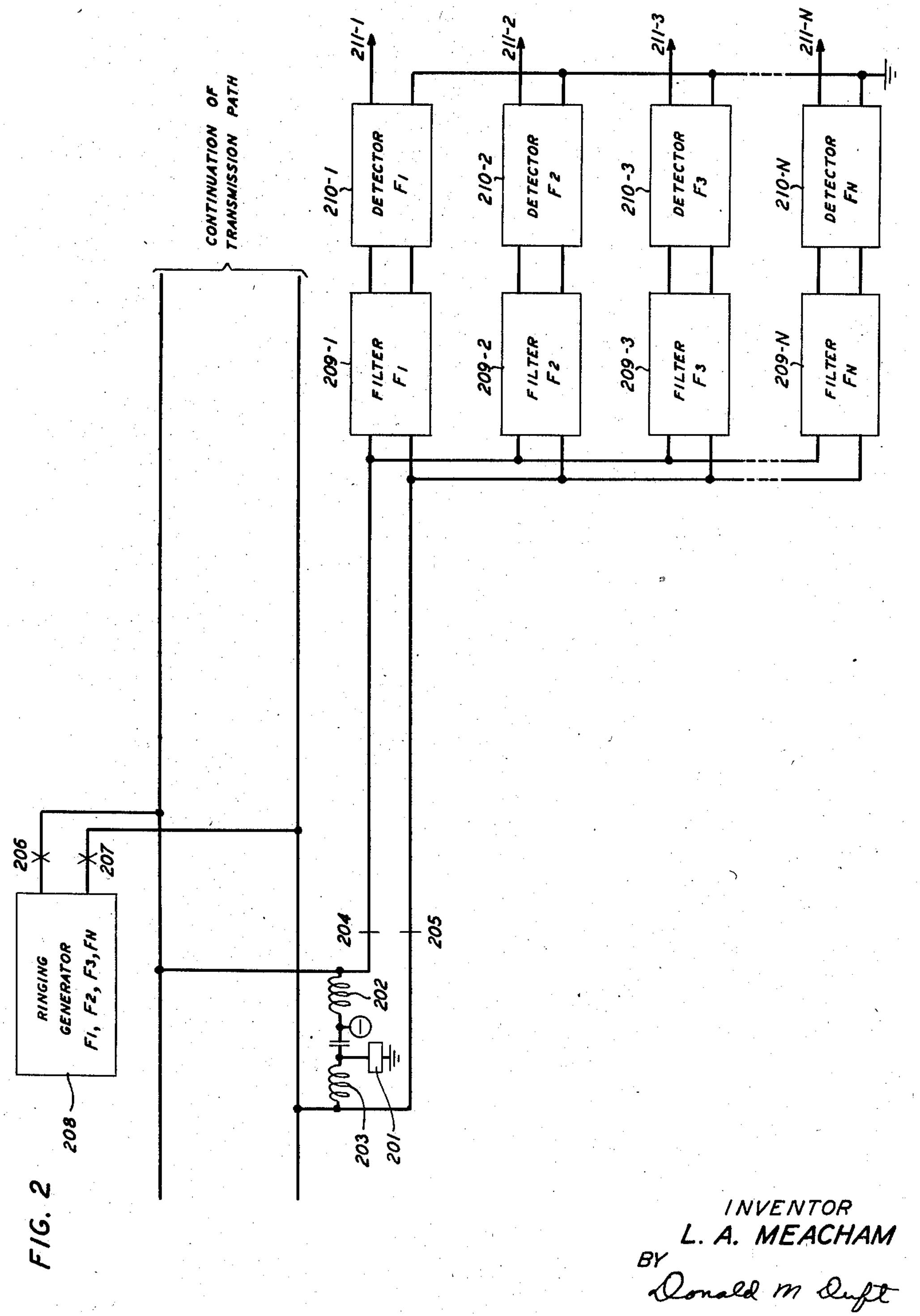

Figs. 1 and 2 together disclose that embodiment of the invention wherein the party identification signal is automatically applied to the line as soon as the switchhook contacts in the calling subset are operated. Fig. 1 discloses the circuit details of a subset while Fig. 2 discloses the central office equipment associated with the present invention. Fig. 1 contains the circuit of a single subset which is connected to the line by terminals 158 and 159. Also connected to this same line is a plurality of other subsets, not shown, which are represented diagrammatically by the bracket in the lower right-hand portion of Fig. 1.

As has been previously explained, the subsets utilized herein perform the dual functions of selective ringing and calling party identification. The subset shown in Fig. 1 comprises a frequency selective amplifier and ringer when in an on-hook condition and a party identification means when in an off-hook condition. The operation of the circuit as a frequency selective amplifier and ringer will first be described, since an understanding thereof is necessary for an understanding of how the circuit performs as a calling station identification means upon the initiation of a call therefrom.

When a call intended for the subset shown in Fig. 1 is received at the central office, the ringing generator 208 is connected to the line by means of make contacts 206 and 207 and applies a ringing signal to the line of the frequency to which the subset of station 1 is responsive. The ringing generator is only shown diagrammatically since neither the details of its operation nor the manner by which it is connected to the line by contacts 206 and 207 are part of the present invention.

Let it be assumed that the subset of station 1 is responsive to a signal of frequency F1 and therefore, the ringing generator 208 applies a signal of frequency F1 to the line upon the reception of a call intended for this station. The ringing voltage applied to the line is transmitted thereover to station 1 wherein it is impressed across a series circuit comprising condenser 149, resistor 150 and a pair of oppositely poled varistors 148 which, advantageously, may be of the silicon diode type. The purpose of condenser 149 is to prevent any direct current from flowing through this series circuit. The purpose of resistor 150 and varistors 148 is to provide a means whereby a relatively constant amplitude of voltage appears across varistors 148 despite a wide variation in the value of the ringing voltage applied to terminals 158 and 159. Varistors 148 act as voltage limiters or amplitude clippers and effectively limit the amplitude of the signal applied thereto to a maximum of approximately .6 volt.

Although the ringing generator impresses a relatively constant value of ringing potential on the line during each and every call, the ringing potential actually applied to the terminals of the different subsets may vary considerably depending upon the distance of each subset from the central office. For example, the subset closest to the central office will naturally have a higher ringing potential transmitted thereto than will the subset furthest from the office because of the difference in line losses. Tests have shown that the ringing potential applied to the various subsets may vary between .5 and 2 volts. This constitutes a 12 db variation and is too great for optimum operation of the remainder of the circuit. Therefore, the series combination of resistor 150 and varistors 148 is used to minimize the variation in ringing voltage applied to condenser 151.

That portion of the ringing voltage appearing across varistors 148 is applied to a series parallel resonant circuit comprising condenser 151 in series with a parallel resonant circuit comprising inductance 146 and condenser 147. The parallel resonant circuit is adjusted to the assigned party frequency by means of the taps on inductance 146. The ringing frequency to which this subset is responsive is slightly below the natural resonant frequency of this parallel resonant circuit. However, the ringing frequency is sufficiently close to its natural resonant frequency so that the impedance of the parallel resonant circuit at the ringing frequency is only slightly less than its impedance at its natural resonant frequency.

It is well known that a parallel resonant circuit is essentially inductive below and capacitive above its resonant frequency. Therefore, operating the parallel resonant circuit comprising inductance 146 and condenser 147 just slightly below its resonant frequency causes this LC network to appear as a large inductance insofar as condenser 151 is concerned. The value of condenser 151 is such that it, together with the effective inductance presented by the parallel resonant circuit comprises a series resonant circuit tuned to the ringing frequency to which this subset is responsive.

The use of the parallel resonant circuit as part of the series resonant circuit is necessitated by several reasons. First of all, the network comprising resistor 150 and condenser 151 in series with the parallel combination of inductance 146 and condenser 147 is effectively across the line. This network must present a high bridging impedance to the line for speech frequencies as well as for the ringing frequencies to which the other subsets on the line are responsive. Secondly, the input voltage to the transistor amplifier is developed across inductance 146 and condenser 147 and, therefore, this parallel circuit must present a very high impedance to the ringing frequency in order that a sufficient signal will be developed across it to energize the amplifier. Circuit elements 151, 147 and 146 meet both of these qualifications since they present a high bridging impedance to the line and also enable the parallel combination of elements 146 and 147 to act as an effective inductance many times larger than that of the actual value of inductance 146 by itself. As a matter of interest, the effective inductive value of elements 146 and 147 in parallel, is equal to that of an inductance so large that it would be impracticable to house it within a conventional subset.

The ringing voltage developed across the parallel circuit comprising inductance 146 and condenser 147 is applied to the base 134 of transistor 132. The output of this stage is taken from collector 135 and applied through diode 136 and resistor 137 to the base 140 of transistor 138. The output of this stage is taken from collector 139 and applied through break switchhook contacts 153 to the horn type transducer 129 in series with variable resistor 130 to the other side of the line. The horn 129 emits an audible tone to notify the subscriber of the call. The volume of the signal emitted by horn 129 is adjusted to a pleasing level by resistor 130. Inductance 152 acts as a choke, which in conjunction with a by-pass condenser 131 prevents the output of the ringer amplifier from appearing on the line to any objectionable extent during the ringing interval.

The base 134 of transistor 132 is biased to the same D.C. potential as that of the emitter 133 through a path comprising inductance 145; and similarly, the base 140 of transistor 138 is biased to the same D.C. potential as that of the emitter 141 through a path comprising resistor 142. Under these conditions neither transistor draws appreciable emitter or collector current. In fact if these transistors are of the silicon junction type, as is preferred, they are effectively biased substantially below cut-off, for neither passes appreciable collector current until a signal amplitude of at least several tenths of a volt is applied to its base. Both transistor stages thus operate in the mode familiarly known as class C. This mode has the advantage of minimizing stand-by current drawn by the ringer in the quiescent condition, and the great further advantage of preventing spontaneous oscillation of the circuit when arranged as an oscillator, as is hereinafter described, unless the oscillation is started by energizing the tuned circuit 146, 147 either by shock excitation or by a triggering pulse of suitable frequency.

Diode 136 is reverse biased and functionally constitutes a means of absorbing approximately 25 volts of the potential applied to the two-stage transistor amplifier. The purpose of this diode is to prevent those speech frequencies lying within the range of the signaling frequencies to which the subset is responsive from energizing the ringer amplifier. For example, without this diode it is possible that during periods of conversation over the line certain words might contain frequencies equal to that to which the amplifier of Fig. 1 normally responds during the ringing interval. The normal line potential during conversation periods is approximately 20 volts. Therefore, diode 136, which requires 25 volts or more in order to cause it to break down and conduct in a backward direction, prevents transistor 132 from operating unless more than 25 volts is applied to the line. The presence of the diode has no effect on the circuit during the ringing interval since the direct-current potential on the line at that time is 50 volts which is more than enough to break down the back resistance of the diode and furnish sufficient operating potential to the amplifier.

Microphone 101, receiver 102, together with parts 103 through 128 comprise the speech circuit portion of the subset. This speech circuit is identical to that disclosed in Patent 2,801,288 to L. A. Meacham, July 30, 1957 and is incorporated as a part of this specification as to the same extent as if fully disclosed herein. The details of this speech circuit together with the intricacies of its operation, as disclosed in the Meacham patent, are not necessary to an understanding of the present invention since, insofar as it is concerned, it is only necessary to understand that the speech circuit impresses the speech currents generated by microphone 101 onto the line and impresses the speech currents received from the line onto receiver 102.

The circuit details described so far in connection with Fig. 1 pertain to the subset in its on-hook condition wherein it comprises a frequency selective transistorized ringer together with an associated speech circuit. During the time the line is idle and prior to the initiation of a call, condenser 131 charges up to the full line potential of approximately 50 volts. This circuit may be traced from terminal 158, through inductance 152, closed switchhook contacts 155, condenser 131 to terminal 159. Therefore, condenser 131 is normally charged up to the full 50 volt line potential during idle periods of the line.

When the subscriber lifts the receiver to initiate a call, the switchhook contacts operate and at contacts 153 transfer the output of the transistor amplifier from horn 129 back to the input of the amplifier at the base 134 of transistor 132 through resistor 143. A circuit is also closed at this time through make contacts 155 which complete a path from charged condenser 131 to a network comprising resistor 157 and condenser 156 in parallel. This circuit allows a small pulse of current, as determined by the charging time of condenser 156, to be impressed on inductance 145. This together with the aforementioned feedback circuit, shock excites the amplifier into oscillation and causes it to generate a signal of the same frequency as that to which the amplifier is normally responsive during ringing intervals.

During this oscillation, power for the transistors is provided by the charged condenser 131, which in the off-hook condition is disconnected from the inductance 152 by the opening of the upper two of contacts 155. Accordingly, the oscillation ceases in a fraction of a second as this source of power becomes exhausted.

A portion of the oscillator voltage appears across the low-impedance winding 144 on the core of inductance 145 and is fed to the speech amplifier at the base 127 of the transistor 125. Transistor 125 amplifies the output of the oscillator and impresses it on the line at point 160 and at closed switchhook contacts 154. The signal is transmitted over the line to the central office where it passes through break contacts 204 and 205 and is applied to the filter and detector circuits.

The filter and detector circuits comprise a plurality of filters 209—1 through 209–N together with a plurality of detectors 210—1 through 210–N. Each filter, together with its related detector, is associated with one of stations 1 through N on the line. Each filter is designed to pass only the signals impressed on the line by the oscillator in its related subset. After passing through the proper filter, the signal is fed to a detector which applies a potential to its output conductor, thereby manifesting the identity of the calling station. The detector output leads are shown as elements 211—1 through 211–N in Fig. 2. The potential applied to each of these conductors may be utilized to energize a light, operate a message register, or perform whatever circuit operations may be desired to assure that the proper party is charged for the call.

The filters and detectors are shown in diagrammatic form only, since such circuits are well known in the art and since the details thereof comprise no part of the present invention. In its simplest embodiment, each filter, together with its related detector, for example, filter F1 and detector F1, could together comprise a frequency responsive relay which is adjustable so as to operate only when signals from the output of the oscillator in station 1 are impressed on the line. Relays of this type are well known in the telephony art and specifically, such relays are found in the copending application of W. H. T. Holden-E. Vroom Serial No. 408,120, filed February 4, 1954, now Patent No. 2,847,508, issued August 12, 1958.

A more sophisticated embodiment of the filters and detectors would utilize an electronic means for performing the same function such as, for example, an LC resonant circuit together with a diode detector.

In summary, the output from the oscillator of the subset shown in Fig. 1 is transmitted over the line to the central office and then through break contacts 204 and 205, through filter F1 and detector F1, which are individually associated with station 1, thereby causing detector F1 to apply an output potential to lead 211—1.

Circuit elements 201, 202 and 203 disclose one of many possible means of supplying energizing potential to the line plus a means for recognizing a request for service on the line. If desired, relay 201 could be replaced by a resistor together with additional circuitry which would recognize an increased IR drop across the resistor as a request for service on the line. Break contacts 204 and 205 symbolically represent a means for disconnecting the filters and detectors from the line once the party identification operations have been completed. The particular apparatus for operating these contacts comprises no part of the present invention and would of course, depend upon the peculiarities of the associated switching system.

The energy to power the amplifier as an oscillator is furnished solely by condenser 131 and, therefore, the amplifier oscillates only for a short period of time as determined by the capacity of condenser 131. Experiments have shown that the circuit oscillates approximately from two- to three-tenths of a second. After this, the potential on the condenser falls sufficiently so that the amplifier no longer oscillates. This causes no difficulty since the detector circuits at the central office can operate satisfactorily on signals of this duration.

Figures 4, 6:
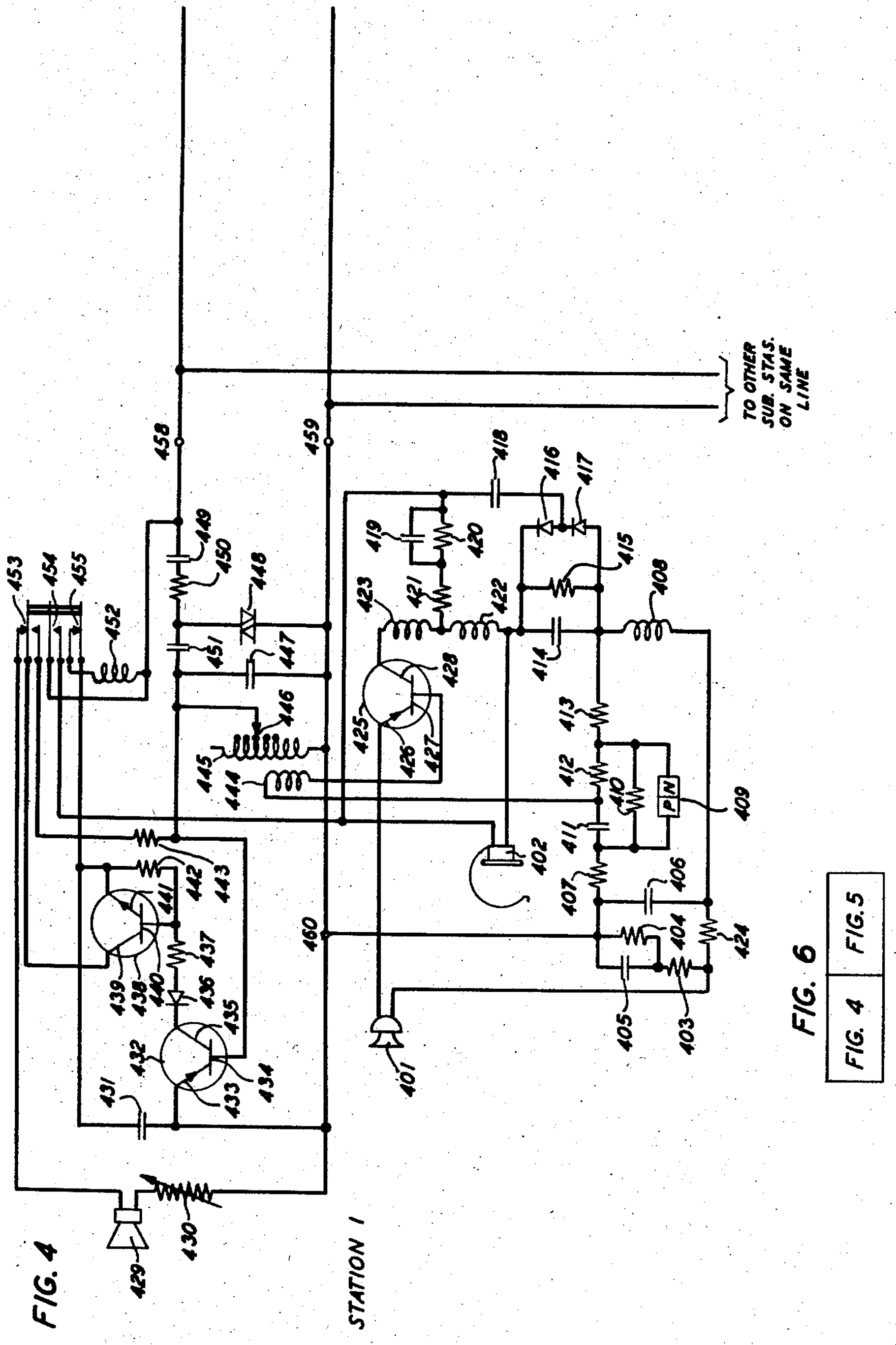
Figs. 4 and 5 illustrate another exemplary embodiment of the invention.
Fig. 6 shows how Figs. 4 and 5 should be arranged with respect to each other.
Figure 5:
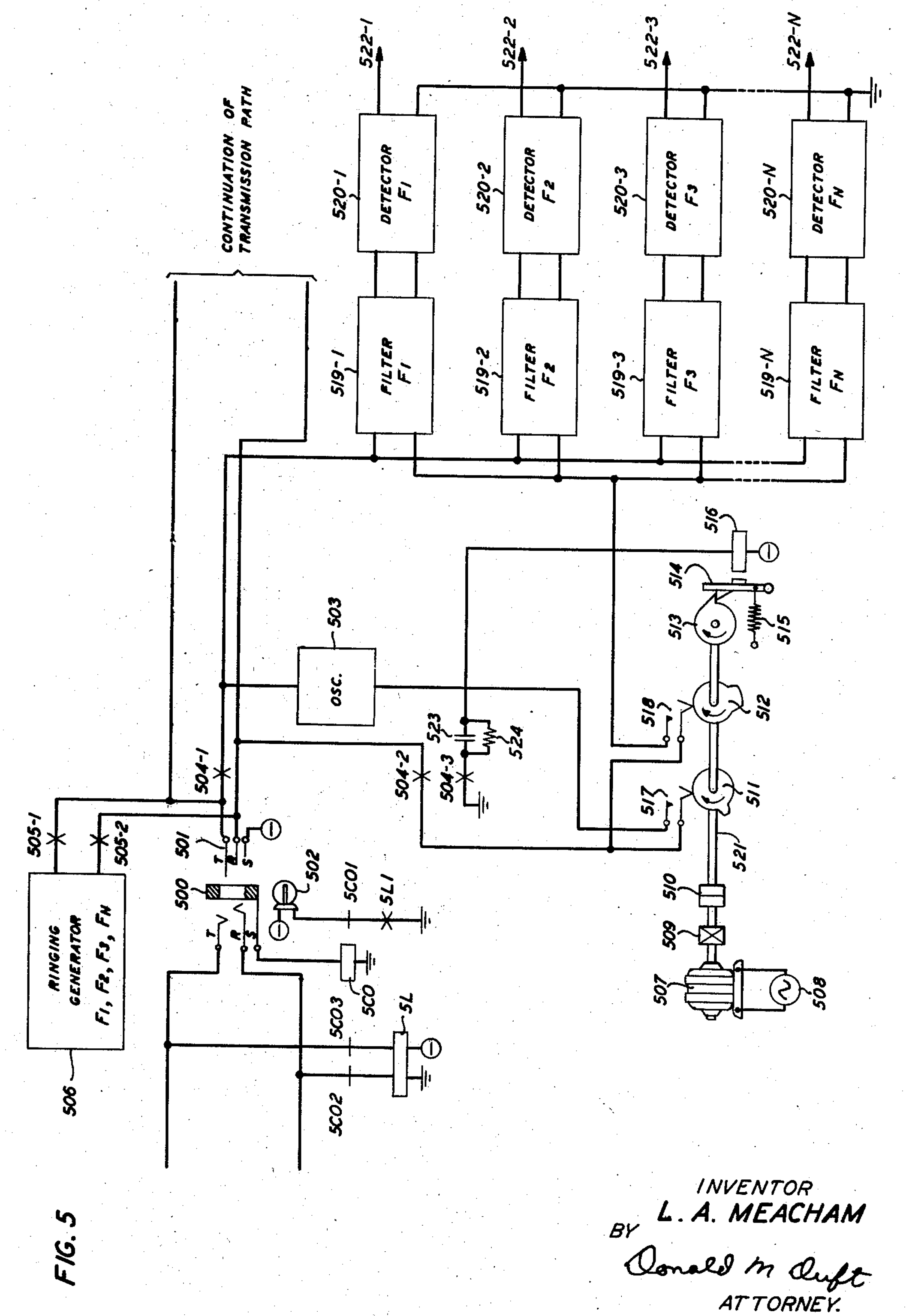

Figs. 4 and 5 together disclose the embodiment of the invention wherein the amplifier of the calling subset does not oscillate immediately upon the initiation of an off-hook condition but, instead, waits until a trigger pulse of the proper frequency is applied to the line by the central office in response to the recognition by the central office of a request for service on the line. The subset circuit shown in Fig. 4 is identical to that of Fig. 1 during the time the subset is in an on-hook condition, and thus comprises a frequency selective transistorized ringer and a speech circuit identical in all respects to that previously described in connection with Fig. 1 for an on-hook condition.

When the switchhook contacts of Fig. 4 close upon the initiation of a call from this subset, the output 439 of transistor 438 is transferred from the horn 429 to the input of the amplifier through resistor 443 in a manner similar to that already described. However, since this circuit has no feedback network as does the circuit of Fig. 1 and since both transistors 432 and 438 are biased beyond cut-off for "class C" operation as is described in connection with the preceding circuit, the amplifier does not oscillate at this time.

The closure of the switchhook contacts completes a circuit to operate the line relay 5L from battery on one side of its winding, through one of its windings, break contacts 5CO3, one side of the line, terminal 458, closed switchhook contacts 454, receiver 402, induction coil-windings 422 and 423, collector 428 of transistor 425, emitter 426 of the same transistor, carbon transmitter 401, resistors 403 and 404 in series, point 460, terminal 459, the other side of the line, break contacts 5CO2, the other winding of line relay 5L, to ground.

Relay 5L operates over this path and closes a path from ground on its contacts 5L1, through break contacts 5CO1, to energize lamp 502. An operator, upon seeing that lamp 502 is energized, inserts plug 501 into jack 500 to answer a call on this line. This closes a path from battery on the sleeve of the plug, through the sleeve of jack, to the winding of relay 5CO to operate it. The operation of relay 5CO opens its break contacts 5CO2 and 5CO3 which disconnect line relay 5L from the line thereby releasing it. The release of relay 5L together with the operation of relay 5CO extinguishes lamp 502 by opening break contacts 5CO1 and releasing make contacts 5L1.

The operator now closes a key having contacts 504—1, 504—2 and 504—3 in order to ascertain the identity of the calling party. The closure of contacts 504—3 closes a path to charge condenser 523 from ground on contacts 504—3, through condenser 523, through the winding of solenoid 516, to battery. This circuit allows the solenoid to be operated for a brief interval of time by the charging current of condenser 523. The solenoid only remains operated during the time the charging current through the condenser is at a maximum and releases as soon as this current begins to diminish.

The momentary operation of solenoid 516 causes member 514 to rotate far enough clockwise against the tension of spring 515 so that its tooth clears the tooth on cam 513. Cam 513 is mounted on shaft 521 which is connected to a slip clutch 510. Clutch 510 is connected through a gear reduction train 509 to a motor 507 which is continuously energized by source 508. Normally, the tooth on member 514 engages the tooth on cam 513 and thereby prevents shaft 521 from rotating. However, the momentary operation of solenoid 516 disengages member 514 from cam 513 and thereby allows shaft 521, to rotate one revolution clockwise.

Early during the rotation of shaft 521 cam contacts 517 engage the tooth on cam 511 and close for a brief interval of time as determined by the contour of the tooth. The closure of cam contacts 517 completes a circuit through closed key contacts 504—1 and 504—2 whereby oscillator 503 is connected across the line. The function of this oscillator is to supply a series of trigger pulses to the line, one for each station thereon, with each pulse being of a different frequency and of a frequency to which one of the subsets on the line is responsive during the ringing interval.

This oscillator may comprise any one of a plurality of types. It may be a single oscillator of the wobbulator type which continuously varies its output frequency and, at an appropriate rate, sweeps its output across the range of frequencies necessitated by the subset ringer amplifiers on the line. Alternatively, oscillator 503 could comprise a plurality of separate oscillators, one for each subset on the line, whose outputs are sequentially applied to the line by either an electronic gating means of a suitable type of by a mechanical means, such as relay chain or a motor driven cam arrangement. Oscillator 503 is shown diagrammatically since the specific details thereof are of no importance to the present invention and since it may constitute any one of the aforementioned forms, all of which are well known in the art.

Oscillator 503 applies a series of trigger pulses, one for each subset on the line, to the line during the interval of time that cam contacts 517 are closed. The ringer amplifier of Fig. 4 remains in a quiescent condition until a trigger pulse of the frequency to which it is normally responsive is applied to the line by oscillator 503. When this trigger pulse is received and impressed across inductance 445, the amplifier is excited into oscillation to generate a signal which is amplified and applied to the line in the same manner as already described in connection with the circuit of Fig. 1. As has also been described, the signal generated by the oscillator persists from two- to three-tenths of a second. Sometime during this interval, cam contacts 517 open and cam contacts 518 close as shaft 521 continues its clockwise rotation. The closure of cam contacts 518 after the opening of cam contacts 517 closes a circuit to connect the filters and detectors across the line in series with closed contacts 504—1 and 504—2.

The signal applied to the line by the oscillating ringer amplifier of station 1 passes through filter F1 and energizes the detector F1 which then manifests the identity of the calling party by applying a potential to output lead 522—1. The potential on this lead may be utilized in whatever manner may be desired to insure that the proper party is charged for the call.

Some time after the filter and detector circuits have had ample time to respond to the oscillator signal on the line, cam contacts 518 open as shaft 521 continues its clockwise rotation. The opening of contacts 518 disconnects the filters and detectors from the line. Shaft 521 continues its clockwise rotation until the tooth on cam 513 engages member 514. At this time the cam stops its rotation.

The operator releases the key once the identity of the calling party has been ascertained and thereby opens key contacts 504—1, 504—2 and 504—3 which disconnect the party identification equipment from the line. Resistor 524 provides a leakage path for the charge on condenser 523.

The embodiment shown in Figs. 4 and 5 was disclosed with a manual system only for reasons of simplicity in presentation. It is to be understood that this embodiment is suited for use in any automatic switching system. When used in such a system, suitable electronic or electromagnetic means would be provided for recognizing a request for service on the line, applying the series of trigger pulses to the line, connecting the filters and detectors to the line for the necessary duration of time, and then disconnecting the entire party identification circuits from the line.

It is to be understood that the above-described arrangements are but illustrative of the application of the purposes of the invention. Numerous other arrangements may be devised by those skilled in the art without departing from the spirit and scope of the invention.

What is claimed is:

1. In a telephone system having a central office, a line extending from said central office, and a plurality of subscriber stations connected to said line; a frequency selective ringer amplifier in each of said stations with each being responsive to a ringing frequency individual thereto, each of said ringer amplifiers being connected to an electroacoustical transducer during the on-hook condition of its station and also being effective when a ringing voltage of its responsive frequency is applied to said line to cause its associated transducer to emit an audible tone, and means in each of said stations whereby upon the initiation of a call therefrom the ringer amplifier therein oscillates and applies to said line a station identification signal whose frequency is equal to the frequency to which said last-named amplifier is responsive.

2. In a telephone system, a central office, a line extending from said central office, a plurality of subscriber stations connected to said line, a frequency selective ringer amplifier in each of said stations with each being responsive to a ringing frequency individual thereto, each of said ringer amplifiers being connected to an electroacoustical transducer during the on-hook condition of its station and also being effective when a ringing voltage of its responsive frequency is applied to said line to cause its associated transducer to emit an audible tone, means whereby upon the initiation of a call from one of said stations its ringer amplifier is caused to oscillate and apply to said line a signal whose frequency is equal to the frequency to which said last-named ringer amplifier is responsive, and means in said central office responsive to the application of said signal to said line whereby the identity of said calling station is ascertained from the frequency of said signal.

3. In a telephone system, a central office, a line extending from said central office, a plurality of subscriber stations connected to said line, a frequency selective ringer amplifier in each of said stations with each being responsive to a ringing frequency individual thereto, each of said ringer amplifiers being connected to an electroacoustical transducer during the on-hook condition of its station and also being effective when a ringing voltage of its responsive frequency is applied to said line to cause its associated transducer to emit an audible tone, means responsive to the initiation of a call from one of said stations whereby the output of the ringer amplifier therein is connected to its input, means including said last-named means responsive to the initiation of a call whereby said last-named amplifier is caused to oscillate and apply to said line a signal whose frequency is equal to the frequency to which said amplifier is responsive, and means in said central office whereby the identity of said calling station is ascertained from the frequency of the signal applied to said line.

4. In a telephone system, a central office, a line extending from said central office, a plurality of subscriber stations connected to said line, a frequency selective ringer amplifier in each of said stations with each being responsive to a ringing frequency individual thereto, each of said ringer amplifiers being connected to an electroacoustical transducer during the on-hook condition of its station and also being effective when a ringing voltage of its responsive frequency is applied to said line to cause its associated transducer to emit an audible tone, means in each station responsive to the initiation of a call therefrom to apply an excitation pulse to the input of its ringer amplifier, and additional means in each station responsive to the initiation of a call therefrom whereby its ringer amplifier is caused to oscillate and apply to said line an identification signal whose frequency is equal to the frequency to which said last-named amplifier is responsive.

5. In a telephone system, a central office, a line extending from said central office, a plurality of subscriber stations connected to said line, a frequency selective ringer amplifier in each of said stations with each being responsive to a ringing frequency individual thereto, each of said ringer amplifiers being connected to an electro-acoustical transducer during the on-hook condition of its station and also being effective when a ringing voltage of its responsive frequency is applied to said line to cause its associated transducer to emit an audible tone, means in each station responsive to the initiation of a call therefrom to apply an excitation pulse to the input of its ringer amplifier, additional means in each station responsive to the initiation of a call therefrom whereby its ringer amplifier is caused to oscillate and apply to said line a signal whose frequency is equal to the frequency to which said last-named amplifier is responsive, and means in said central office whereby the identity of said calling station is ascertained from the frequency of the signal applied to said line.

6. In a telephone system, a central office, a line extending from said central office, a plurality of subscriber stations connected to said line, a frequency selective ringer amplifier in each of said stations with each being responsive to a ringing frequency individual thereto, each of said ringer amplifiers being connected to an electro-acoustical transducer during the on-hook condition of its station and also being effective when a ringing voltage of its responsive frequency is applied to said line to cause its associated transducer to emit an audibile tone, means in each station responsive to the initiation of a call therefrom to apply an excitation pulse to the input of its ringer amplifier, additional means in each station responsive to the initiation of a call therefrom whereby the output of its ringer amplifier therein is connected to its input, means responsive to said connection whereby said last-named amplifier is caused to oscillate and apply to said line a signal whose frequency is equal to the frequency to which said amplifier is responsive, and means in said central office whereby the identity of said calling station is ascertained from the frequency of the signal applied to said line.

7. In a telephone system, a central office, a line extending from said central office, a plurality of subscriber stations connected to said line, a frequency selective ringer amplifier in each of said stations with each being responsive to a ringing frequency individual thereto, each of said ringer amplifiers being connected to an electro-acoustical transducer during the on-hook condition of its station and also being effective when a ringing voltage of its responsive frequency is applied to said line to cause its associated transducer to emit an audible tone, means responsive to the initiation of a call from one of said stations whereby said central office recognizes a request for service on said line, and means operative in said central office whereby the ringer amplifier in said calling station is caused to oscillate and apply to said line an identification signal whose frequency is equal to the frequency to which said last-named amplifier is responsive.

8. In a telephone system, a central office, a line extending from said central office, a plurality of subscriber stations connected to said line, a frequency selective ringer amplifier in each of said stations with each being responsive to a ringing frequency individual thereto, each of said ringer amplifiers being connected to an electroacoustical transducer during the on-hook condition of its station and also being effective when a ringing voltage of its responsive frequency is applied to said line to cause its associated transducer to emit an audible tone, means responsive to the initiation of a call from one of said stations whereby said central office recognizes a request for service on said line, means operative in said central office whereby the ringer amplifier in said calling station is caused to oscillate and apply to said line a signal whose frequency is equal to the frequency to which said last-named amplifier is responsive, and means in said central office whereby the identity of said calling station is ascertained from the frequency of the signal applied to said line.

9. In a telephone system, a central office, a line extending from said central office, a plurality of subscriber stations connected to said line, a frequency selective ringer amplifier in each of said stations with each being responsive to a ringing frequency individual thereto, each of said ringer amplifiers being connected to an electro-acoustical transducer during the on-hook condition of its station and also being effective when a ringing voltage of its responsive frequency is applied to said line to cause its associated transducer to emit an audible tone, means responsive to the initiation of a call from one of said stations whereby the output of the ringer amplifier therein is connected to its input, additional means responsive to the initiation of a call from one of said stations whereby said central office recognizes a request for service on said line, means operative in said central office whereby the amplifier in said calling subset is caused to oscillate and apply to said line a signal whose frequency is equal to the frequency to which said last-named amplifier is responsive, and means in said central office whereby the identity of said calling station is ascertained from the frequency of the signal applied to said line.

10. In a telephone system, a central office, a line extending from said central office, a plurality of stations connected to said line, a frequency selective ringer amplifier in each of said stations with each being responsive to a ringing frequency individual thereto, each of said ringer amplifiers being connected to an electro-acoustical transducer during the on-hook condition of its station and also being effective when a ringing voltage of its responsive frequency is applied to said line to cause its associated transducer to emit an audible tone, means responsive to the initiation of a call from one of said stations whereby the output of the ringer amplifier therein is connected to its input, means operable upon the initiation of a call from one of said stations whereby a circuit is closed to interconnect said one station with said central office, means in said central office operable subsequent to said interconnection whereby a series of trigger pulses is applied to said line, each of said pulses being of a different frequency and each being of a frequency to which one of the ringer amplifiers on said line is responsive, and means in said calling station responsive to the application to said line of a trigger pulse having a frequency equal to the frequency to which its ringer amplifier is responsive to cause said last-named amplifier to oscillate and apply to said line a station identification signal whose frequency is equal to the frequency to which its amplifier is responsive.

11. In a telephone system having a central office, a line extending from said central office, and a plurality of subscriber stations connected to said line; a ringer amplifier responsive to a unique and distinctive frequency in each of said stations with each being responsive to a ringing frequency individual thereto, each of said ringer amplifiers being connected to an electroacoustical transducer during the on-hook condition of its station and also being effective when a ringing voltage of its responsive frequency is applied to said line to cause its associated transducer to emit an audible tone, and means whereby upon the initiation of a call from any station its ringer amplifier is caused to oscillate and apply to said line a signal whose frequency identifies the station currently initiating a call.

12. In a telephone system, a central office, a line extending from said central office, a plurality of subscriber stations connected to said line, a frequency selective ringer amplifier in each of said stations with each being responsive to a ringing frequency individual thereto, each of said ringer amplifiers being connected to an electroacoustical transducer during the on-hook condition of its station and also being effective when a ringing voltage of its responsive frequency is applied to said line to cause its associated transducer to emit an audible tone, means responsive to the initiation of a call from one of said stations whereby the output of the ringer amplifier therein is connected to its input, means including said last-named means responsive to the initiation of a call whereby said last-named amplifier is caused to oscillate and apply to said line a signal, and means in said central office whereby the identity of said calling station is ascertained from the frequency of the signal applied to said line.

13. In a telephone system, a central office, a line extending from said central office, a plurality of subscriber stations connected to said line, a frequency selective ringer amplifier in each of said stations with each being responsive to a ringing frequency individual thereto, each of said ringer amplifiers being connected to an electroacoustical transducer during the on-hook condition of its station and also being effective when a ringing voltage of its responsive frequency is applied to said line to cause its associated transducer to emit an audible tone, means in each station responsive to the initiation of a call therefrom to apply an excitation pulse to the input of its ringer amplifier, additional means in each station responsive to the initiation of a call therefrom whereby its ringer amplifier is caused to oscillate and apply to said line a signal whose frequency identifies the station initiating a call.

14. In a telephone system, a central office, a line extending from said central office, a plurality of subscriber stations connected to said line, a frequency selective ringer amplifier in each of said stations with each being responsive to a ringing frequency individual thereto, each of said ringer amplifiers being connected to an electroacoustical transducer during the on-hook condition of its station and also being effective when a ringing voltage of its responsive frequency is applied to said line to cause its associated transducer to emit an audible tone, means responsive to the initiation of a call from one of said stations whereby the output of the ringer amplifier therein is connected to its input, means responsive to the initiation of a call from one of said stations whereby said central office recognizes a request for service on said line, means operative in said central office whereby the amplifier in said calling subset is caused to oscillate and apply to said line a signal, and means in said central office whereby the identity of said calling station is ascertained from the frequency of the signal applied to said line.

15. In a telephone system, a central office, a line extending from said central office, a plurality of stations comprising stations S1—Sn connected to said line, each of said stations containing a frequency selective ringer amplifier responsive to signals of frequencies $f1$—$fn$ respectively, each of said ringer amplifiers being connected to an electroacoustical transducer during the on-hook condition of its station and also being effective when a ringing voltage of its responsive frequency is applied to said line to cause its associated transducer to emit an audible tone, switchhook contacts responsive to the initiation of a call from one of said stations whereby the output of the ringer amplifier therein is connected to its input, additional switchhook contacts responsive to the initiation of a call from one of said stations whereby a circuit is closed to interconnect said one station with said central office, means in said central office operable in response to said interconnection, means operable in said central office whereby a series of trigger pulses of frequencies $f1$—$fn$ is applied to said line, means in said calling station responsive to the application to said line of a trigger pulse having a frequency equal to the frequency to which its ringer amplifier is responsive to cause said amplifier to oscillate and apply to said line a station identification signal whose frequency is equal to the frequency to which its amplifier is responsive, and means in said central office whereby the identity of said calling station is ascertained by the frequency of the signal applied to said line.

16. In a telephone system, a central office, a line extending from said central office, a plurality of subscriber stations connected to said line, a frequency selective ringer amplifier in each of said stations with each being responsive to a ringing frequency individual thereto, each of said ringer amplifiers being connected to an electroacoustical transducer during the on-hook condition of its station and also being effective when a ringing voltage of its responsive frequency is applied to said line to cause its associated transducer to emit an audible tone, a condenser in each of said stations having a charge thereon during the on-hook condition of its subset, means in each station responsive to the initiation of a call therefrom to apply an excitation pulse to the input of its ringer amplifier, and additional means in each station responsive to the initiation of a call therefrom whereby its ringer amplifier is caused to oscillate a short period of time as determined in part by the capacity of said charged condenser, and means responsive to said oscillation whereby an identification signal is applied to the line with the frequency of said signal being equal to the frequency to which said last-named amplifier is responsive.

17. In a telephone system, a central office, a line extending from said central office, a plurality of subscriber stations connected to said line, a frequency selective ringer amplifier in each of said stations with each being responsive to a ringing frequency individual thereto, each of said ringer amplifiers being connected to an electroacoustical transducer during the on-hook condition of its station and also being effective when a ringing voltage of its responsive frequency is applied to said line to cause its associated transducer to emit an audible tone, a condenser in each station having a charge thereon during the on-hook condition of its station, means responsive to the initiation of a call from one of said stations whereby the output of the ringer amplifier therein is connected to its input, means including said condenser responsive to said connection whereby said last-named amplifier is caused to oscillate for a short period of time and apply to said line a signal, and means in said central office whereby the identity of said calling station is ascertained from the frequency of the signal applied to said line.

18. In a telephone system, a central office, a line extending from said central office, a plurality of subscriber stations connected to said line, a frequency selective ringer amplifier in each of said stations with each being responsive to a ringing frequency individual thereto, each of said ringer amplifiers being connected to an electroacoustical transducer during the on-hook condition of its station and also being effective when a ringing voltage of its responsive frequency is applied to said line to cause its associated transducer to emit an audible tone, means responsive to the initiation of a call from one of said stations whereby the output of the ringer amplifier therein is connected to its input, a condenser in each station having a charge thereon during the on-hook condition of its station, additional means responsive to the initiation of a call from one of said stations whereby said central office recognizes a request for service on said line, means operative in said central office whereby the amplifier in said calling subset is caused to oscillate and apply to said line a signal, means including said condenser whereby said oscillations persist for only a short interval of time as determined in part by the capacity of said condenser, and means in said central office whereby the identity of said calling station is ascertained from the frequency of the signal applied to said line.

19. In a telephone system, a central office, a line extending from said central office, a plurality of subscriber stations connected to said line, a frequency selective ringer amplifier in each of said stations with each being responsive to a ringing frequency individual thereto, each of said ringer amplifiers being connected to an electroacoustical transducer during the on-hook condition of its station and also being effective when a ringer voltage of its responsive frequency is applied to said line to cause its associated transducer to emit an audible tone, a pair of transistors in each of said amplifiers biased for class C operation whereby a minimum of current flows therethrough during the absence of a signal input thereto, a normally charged condenser in each of said amplifiers, means in each station responsive to the initiation of a call therefrom to apply an excitation pulse to the input of its ringer amplifier, and additional means including said condenser and said transistors in each station responsive to the initiation of a call therefrom whereby its ringer amplifier is caused to oscillate for a short period of time and apply to said line an identification signal whose frequency is equal to the frequency to which said last-named amplifier is responsive.

20. In a telephone system, a central office, a line extending from said central office, a plurality of subscriber stations connected to said line, a frequency selective ringer amplifier in each of said stations biased for class C operation whereby a minimum of current flows therethrough during the absence of a signal input thereto, each of said ringer amplifiers being connected to an electroacoustical transducer during the on-hook condition of its station and also being effective when a ringing voltage of its responsive frequency is applied to said line to cause its associated transducer to emit an audible tone, means responsive to the initiation of a call from one of said stations whereby the output of the ringer amplifier therein is connected to its input, additional means responsive to the initiation of a call from one of said stations whereby said central office recognizes a request for service on said line, means operative in said central office whereby the amplifier in said calling subset is caused to oscillate and apply to said line a signal, and means in said central office whereby the identity of said calling station is ascertained from the frequency of the signal applied to said line.

References Cited in the file of this patent

UNITED STATES PATENTS

| | | |
|---|---|---|
| 2,315,000 | Logan | Mar. 30, 1943 |
| 2,733,297 | Matlack et al. | Jan. 31, 1956 |
| 2,782,259 | Dimond | Feb. 14, 1957 |